(12) United States Patent
Takahashi

(10) Patent No.: US 10,634,906 B2
(45) Date of Patent: Apr. 28, 2020

(54) EYEBALL-PROJECTION DISPLAY APPARATUS

(71) Applicant: OLYMPUS CORPORATION, Hachioji-shi, Tokyo (JP)

(72) Inventor: Koichi Takahashi, Tokyo (JP)

( * ) Notice: Subject to any disclaimer, the term of this patent is extended or adjusted under 35 U.S.C. 154(b) by 147 days.

(21) Appl. No.: 16/016,139

(22) Filed: Jun. 22, 2018

(65) Prior Publication Data

US 2018/0299670 A1 Oct. 18, 2018

Related U.S. Application Data

(63) Continuation of application No. PCT/JP2015/085823, filed on Dec. 22, 2015.

(51) Int. Cl.
*G02B 27/14* (2006.01)
*G02B 27/00* (2006.01)
(Continued)

(52) U.S. Cl.
CPC ....... *G02B 27/0081* (2013.01); *G02B 17/004* (2013.01); *G02B 25/001* (2013.01);
(Continued)

(58) Field of Classification Search
CPC ............ G02B 17/0832; G02B 17/0848; G02B 23/14; G02B 27/0037; G02B 2027/011; G02B 2027/0178
(Continued)

(56) References Cited

U.S. PATENT DOCUMENTS 6,097,542 A 8/2000 Takahashi et al.
2002/0039232 A1 4/2002 Takeyama

FOREIGN PATENT DOCUMENTS

JP H07218859 A 8/1995
JP H10123454 A 5/1998
(Continued)

OTHER PUBLICATIONS

International Search Report (ISR) and Written Opinion dated Mar. 8, 2016 issued in International Application No. PCT/JP2015/085823.

*Primary Examiner* — Mahidere S Sahle
(74) *Attorney, Agent, or Firm* — Holtz, Holtz & Volek PC

(57) ABSTRACT

The eyeball-projection display apparatus 1 includes an image display device 5 for showing an image, and a virtual image projection optical system 10 in which an image shown by the image display device is optically guided into the eyeball of a viewer for projection of a virtual image, wherein the virtual image projection optical system 10 includes an eyepiece optical system 2 having an eyepiece optical element 20 including an eyepiece transmitting surface 21 and an eyepiece reflecting surface 22 for reflecting off a light ray incident from the eyepiece transmitting surface 21 and again guiding the light ray back into the same eyepiece transmitting surface 21, having a medium filled in between the eyepiece transmitting surface 21 and the eyepiece reflecting surface 22, the medium having a refractive index of greater than 1, and further including a back-surface reflecting mirror capable of only one reflection in an effective optical path and having a positive power; a relay optical system 4 having a positive power, and including a prism optical element 40 having a curved, internal-reflecting surface that is decentered with respect to a center chief ray Lc, being filled in with a medium having a refractive index of greater than 1 and being capable of plural internal reflections, and receiving light from the image display device 5 for projection of an intermediate image of an image onto an exit side of the display apparatus 1; and a reflecting element 3 that is positioned in an optical path between the eyepiece optical system 2 and the relay optical system 4 and includes an intermediate reflecting surface 30 to reflect a light beam (Continued)

incident obliquely from a side of the display apparatus, on which the relay optical system 4 is located, toward a side of the display apparatus 1, on which the eyepiece optical system 2 is located, thereby deflecting an optical path.

20 Claims, 10 Drawing Sheets

(51) Int. Cl.
  *G02B 27/01* (2006.01)
  *G02B 27/42* (2006.01)
  *G02B 17/00* (2006.01)
  *G02B 25/00* (2006.01)
  *G02B 5/10* (2006.01)

(52) U.S. Cl.
  CPC ..... *G02B 27/0172* (2013.01); *G02B 27/4216* (2013.01); *G02B 5/10* (2013.01); *G02B 17/008* (2013.01); *G02B 2027/011* (2013.01)

(58) Field of Classification Search
  USPC .................................................. 359/629–640
  See application file for complete search history.

(56) References Cited

FOREIGN PATENT DOCUMENTS

| JP | 2002090693 A | 3/2002 |
| JP | 2002139695 A | 5/2002 |
| JP | 2012208193 A | 10/2012 |

EYEBALL-PROJECTION DISPLAY APPARATUS

CROSS-REFERENCE TO RELATED APPLICATIONS

This application is based on PCT/JP2015/085823 filed on Dec. 22, 2015. The content of the PCT application is incorporated herein by reference.

BACKGROUND OF THE INVENTION AND RELATED ART STATEMENT

The present invention relates generally to an eyeball-projection display apparatus designed to optically guide an image shown on an image display device into the eyeball of a viewer where it is enlarged as a virtual image for projection.

The eyeball-projection display apparatus known so far in the art include a head-up display used for on-board indicators, and a near-eye display that is located near the eyeball of a viewer where light rays or beams exiting out from an image shown on a display device are guided into the viewer's eyeball for viewing of enlarged virtual images.

Among the near-eye displays, the head-mounted display type having an optical system mounted on the viewer's head goes mainstream. There are also a hand-held near-eye display of the type manually held by the viewer without being mounted on the head, and a near-eye display of the type that the viewer looks in a fixed device.

Conventional optical systems in the eyeball-projection display apparatus capable of viewing in a wide field of view include an optical system of the type in which an intermediate image is formed using a relay optical system and light beams are then guided into the eyeball of the viewer by way of a back-surface mirror for viewing of an enlarged virtual image over a wide field of view, as known from the following publications (JP(A) 2012-208193 and JP(A) 7-218859).

SUMMARY OF INVENTION

According to one embodiment, an eyeball-projection display apparatus includes:

an image display device for showing an image, and a virtual image projection optical system in which an image shown by the image display device is optically guided into the eyeball of a viewer for projection of a virtual image, wherein:

the virtual image projection optical system includes an eyepiece optical system having an eyepiece optical element including an eyepiece transmitting surface and an eyepiece reflecting surface for reflecting off a light ray incident from the eyepiece transmitting surface and again guiding the light ray back into the same the eyepiece transmitting surface, having a medium filled in between the eyepiece transmitting surface and the eyepiece reflecting surface, the medium having a refractive index of greater than 1, and further including a back-surface reflecting mirror capable of only one reflection in an effective optical path and having a positive power;

a relay optical system having a positive power, and including a prism optical element having a curved, internal-reflecting surface that is decentered with respect to a center chief ray, being filled in with a medium having a refractive index of greater than 1 and being capable of plural internal reflections, and receiving light from the image display device for projection of an intermediate image of an image onto an exit side of the display apparatus; and a reflecting element that is positioned in an optical path between the eyepiece optical system and the relay optical system and includes an intermediate reflecting surface to reflect a light beam incident obliquely from a side of the display apparatus, on which the relay optical system is located, toward a side of the display apparatus, on which the eyepiece optical system is located, thereby deflecting an optical path.

DESCRIPTION OF EMBODIMENTS

Figure 1:
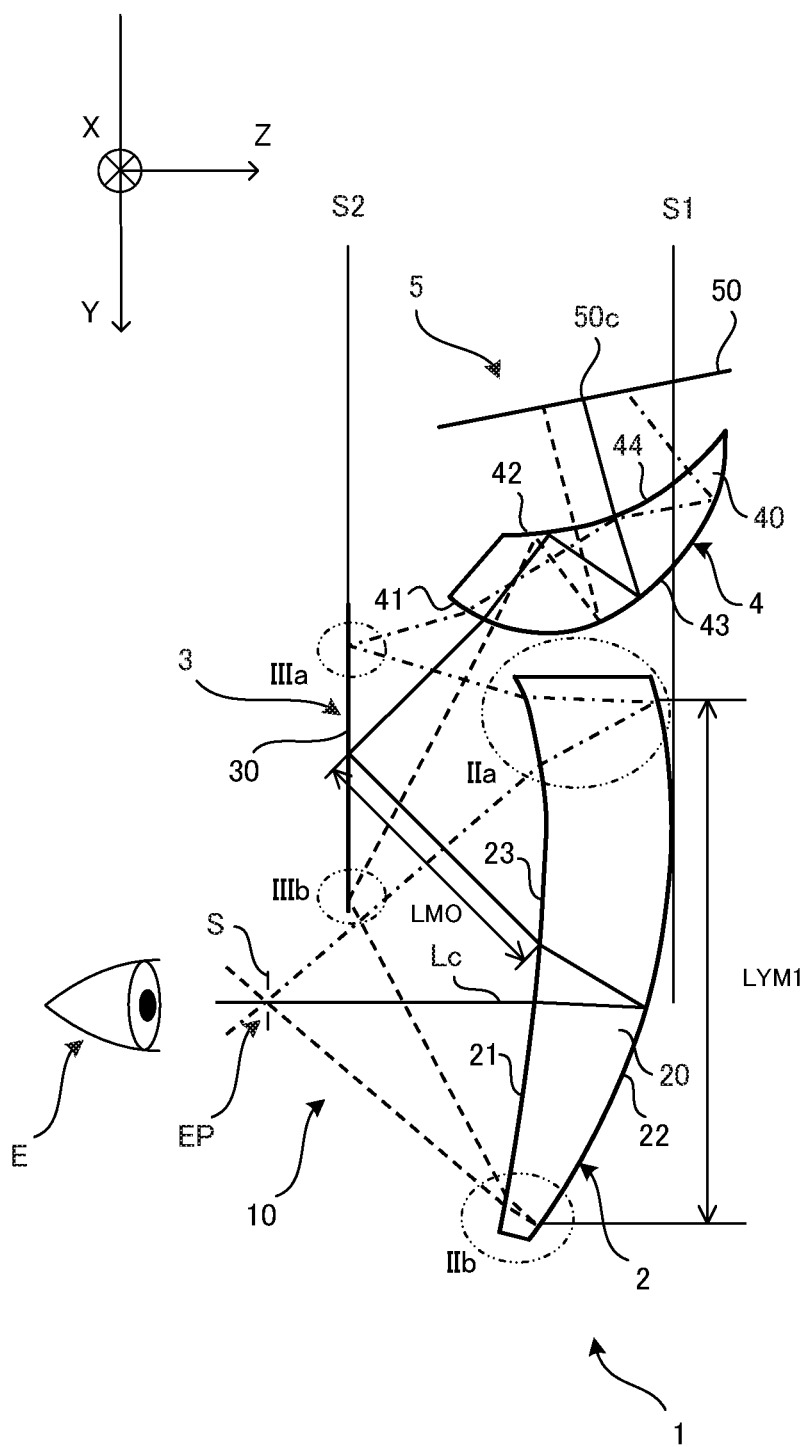
FIG. 1 is illustrative in construction or arrangement of the eyeball-projection display apparatus according to one embodiment.

FIG. 1 is illustrative in construction or arrangement of the eyeball-projection display apparatus 1 according to one embodiment.

The eyeball-projection display apparatus 1 according to one embodiment includes an image display device 5 for showing an image, and a virtual image projection optical system 10 in which an image shown by the image display device 5 is optically guided into the eyeball E of a virtual viewer for projection of a virtual image. The virtual image projection optical system 10 includes an eyepiece optical system 2 having an eyepiece optical element 20 including an eyepiece transmitting surface 21 and an eyepiece reflecting surface 22 for reflecting off a light ray incident from the eyepiece transmitting surface 21 and again guiding the light ray back into the same eyepiece transmitting surface 21, having a medium filled in between the eyepiece transmitting surface 21 and the eyepiece reflecting surface 22, the medium having a refractive index of greater than 1, and further including a back-surface reflecting mirror capable of only one reflection in an effective optical path and having a positive power; a relay optical system 4 having a positive power, the relay optical system 4 including a prism optical element 40 having a curved, internal-reflecting surface that is decentered with respect to a center chief ray, being filled in with a medium having a refractive index of greater than 1 and being capable of plural internal reflections, and receiving light from the image display device 5 for projection of an intermediate image of the image onto an exit side of the apparatus 1; and a reflecting element 3 that is positioned in an optical path between the eyepiece optical system 2 and the relay optical system 4 and includes an intermediate reflecting surface to reflect a light beam incident obliquely from a side of the apparatus 1, on which the relay optical system 4 is located, toward a side of the apparatus 1, on which the eyepiece optical system 2 is located, thereby deflecting an optical path through the apparatus 1.

Reference is here made to the coordinate system used in this embodiment. Suppose now that a dummy surface is set as a position for projection of a virtual image that is projected onto a virtual viewer's eyeball E upon back ray tracing. The Z-axis positive direction is defined by a direction that passes from the center of the retina of the viewer's eyeball where the origin of the virtual image included in the dummy surface is imaged, through the center of an exit pupil EP and is along the direction of travel of a center chief ray Lc vertical to a surface forming the exit pupil EP; the Y-Z plane is defined by a plane including the Z-axis and the center of the image display device 5; the X-axis direction (the depth direction of the sheet plane being a positive direction) is defined by a direction that passes through the center of the exit pupil EP and is orthogonal to the Y-Z plane; and the Y-axis (negative direction) is defined by an axis that forms a left-handed orthogonal coordinate system with the X-axis and Y-axis and comes from the center of the exit pupil EP close to the center of the image display device 5.

With the eyeball-projection display apparatus 1 according to the embodiment described here, it possible for the image on the image display device 5 to be projected as a virtual image onto the viewer's eyeball. The eyeball-projection display apparatus 1, because of incorporating the reflecting element 3, has a folded-back optical path so that the optical elements can be closely packed together. This in turn works in favor of space savings, and makes it possible to reduce the size of an optical system even when it takes a long optical path, resulting in an increase in the degree of freedom in design of the relay optical system 4 and a more compact assembly as well.

In the eyeball-projection display apparatus 1 according to the embodiment described here, the eyepiece transmitting and reflecting surfaces 21 and 22 are so decentered with respect to the center chief ray Lc that there can be a further increase in the degree of freedom in design.

In the eyeball-projection display apparatus 1 according to the embodiment described here, the reflecting element 3 includes a single intermediate reflecting surface 30 capable of only one reflection leading to deflection of the optical path, thus allowing for the reflecting element 3 to have a low-profile construction.

In the eyeball-projection display apparatus 1 according to the embodiment described here, the reflecting element 3 is so constructed of a front surface mirror that there can be a further reduction achieved in the thickness of the reflecting element 3.

In the eyeball-projection display apparatus 1 according to the embodiment described here, suppose now that the Z-axis is defined by an axis that is along the center chief ray Lc exiting out from the virtual image projection optical system 10, and that the YZ plane is defined by a plane including the Z-axis and the center chief ray Lc that is incident on and reflected off the eyepiece reflecting surface 22 of the eyepiece optical system 2. The center 50c of the image shown on the image display device 5 is then positioned between a plane S1 vertical to the Z-axis passing through the outermost position of an effective area of the eyepiece reflecting surface 22 of the eyepiece optical system 2 in the YZ plane and in the Z-axis direction and a plane S2 vertical to the Z-axis passing through the position nearest to the viewer side of an effective area of the intermediate reflecting surface 30 of the reflecting element 3 in the YZ plane and in the Z-axis direction. This layout contributes more to size reductions of the whole apparatus.

In the eyeball-projection display apparatus 1 according to the embodiment described here, suppose that the Z-axis is defined by an axis that is along the center chief ray Lc exiting out from the virtual image projection optical system 10, and that the YZ plane is defined by a plane including the Z-axis and the center chief ray Lc that is incident on and reflected off the eyepiece reflecting surface 22 of the eyepiece optical system 2, as mentioned above. The center 50c of the image shown on the image display device 5 is then positioned between a plane S1 vertical to the Z-axis passing through the outermost position of an effective area of the eyepiece reflecting surface 22 of the eyepiece optical system 2 in the YZ plane and in the Z-axis direction and a plane S2 vertical to the Z-axis passing through the position nearest to the viewer side of an effective area of the intermediate reflecting surface 30 of the reflecting element 3 in the YZ plane and in the Z-axis direction.

In the eyeball-projection display apparatus 1 according to the embodiment described here, suppose again that the Z-axis is defined by an axis that is along the center chief ray Lc exiting out from the virtual image projection optical system 10, and that the YZ plane is defined by a plane including the Z-axis and the center chief ray Lc that is incident on and reflected off the eyepiece reflecting surface 22 of the eyepiece optical system 2. An intermediate image of the center 50c of the image shown on the image display device 5 is then positioned between a plane S1 vertical to the Z-axis passing through the outermost position of an effective area of the eyepiece reflecting surface 22 of the eyepiece optical system 2 in the YZ plane and in the Z-axis direction and a plane S2 vertical to the Z-axis passing through the position nearest to the viewer side of an effective area of the intermediate reflecting surface 30 of the reflecting element 3 in the YZ plane and in the Z-axis direction.

In the eyeball-projection display apparatus 1 according to the embodiment described here, an intermediate image of the center 50c of the image shown is formed in a space between the reflecting element 3 and the eyepiece optical system 2. Thus, even with dust entering the apparatus, it is possible to prevent dust from staying on the center of the intermediate image, making the influences of dust on the intermediate image less.

In the eyeball-projection display apparatus 1 according to the embodiment described here, the reflecting element 3 is disposed outside the range through which an effective light beam exiting out from the eyepiece optical system 2 passes. Such a layout allows for prevention of shadings.

In the eyeball-projection display apparatus 1 according to the embodiment described here, suppose once again that the Z-axis is defined by an axis along the center chief ray Lc exiting out from the virtual image projection optical system 10 and the YZ plane is defined by a plane including the Z-axis and the center chief ray Lc incident on and reflected off the eyepiece reflecting surface 22 of the eyepiece optical system 2. Then, the display apparatus 1 satisfies the following condition (1):

$$1°<\theta1min<\theta1max<30° \quad (1)$$

where θ1min and θ1max stand for the minimum and maximum values of the angle of incidence of the chief ray on the YZ plane at the eyepiece reflecting surface 22 of the eyepiece optical system 2, respectively.

Figure 2A:
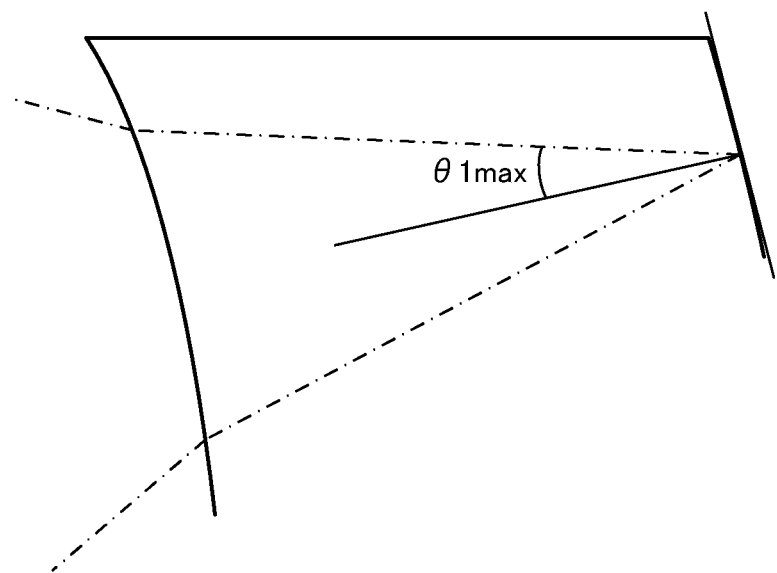
FIGS. 2A and 2B are enlarged views for IIa and IIb, respectively, appearing in FIG. 1.
Figure 2B:
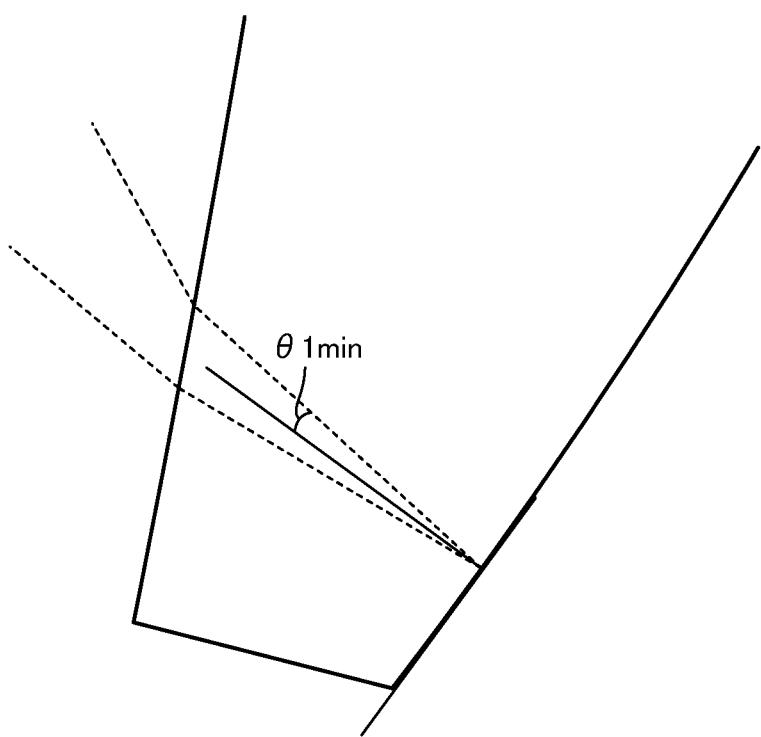

FIGS. 2A and 2B are enlarged views of IIa and IIb, respectively, appearing in FIG. 1: FIG. 2A is an enlarged view of IIa indicating θ1max, and FIG. 2B is an enlarged view of IIb indicating θ1min.

As Condition (1) is satisfied, it is easy for the viewer to avoid interference of the face with the apparatus.

Being short of the lower limit to Condition (1) causes the light reflected off the reflecting element 3 to go back to the reflecting element 3 because it is reflected off the eyepiece optical system 2. In turn, this causes the reflecting element 3 to come close to the eye point EP, resulting in difficulty making an eye relief long. Exceeding the upper limit to Condition (1), too, has difficulty making the eye relief long, resulting in likely interference of the viewer with the reflecting element 3.

The lower limit value of Condition (1) should be preferably 3° and more preferably 5°, and the upper limit value of Condition (1) should be preferably 25° and more preferably 20°.

In the eyeball-projection display apparatus 1 according to the embodiment described here, suppose now that the Z-axis is defined by an axis along the center chief ray Lc exiting out from the virtual image projection optical system 10, the YZ plane is defined by a plane including the Z-axis and the center chief ray Lc incident on and reflected off the eyepiece reflecting surface 22 of the eyepiece optical system 2, and the Y-axis direction is defined by a direction vertical to the Z-axis at the YZ plane. Then, the display apparatus 1 satisfies the following condition (2):

$$0.7<LYM1/LM0<5 \quad (2)$$

where LYM1 stands for a length of an effective reflecting surface, as measured in the Y-axis direction, of the eyepiece reflecting surface 22 of the eyepiece optical system 2 at the YZ plane, and LM0 stands for a separation distance between the reflecting element 3 and the eyepiece optical system 2 as measured along the center chief ray Lc.

Condition (2) is provided to determine the size of the eyepiece optical system 2 and the separation between the eyepiece optical system 2 and the reflecting element 3 or, in another parlance, to determine a proper position relation and element size. As Condition (2) is satisfied, it allows for the relay optical system 4 to become compact, leading to weight and size reductions.

Being short of the lower limit to Condition (2) most likely increases in the whole size of the optical system or, alternatively, gives rise to interference of the viewer's head with the reflecting element 3, and exceeding the upper limit to Condition (2) quite likely gives rise to interference of the eyepiece optical system 2 with the relay optical system 4.

The lower limit value of Condition (2) should be preferably 1 and more preferably 1.4, and the upper limit value of Condition (2) should be preferably 3 and more preferably 2.3.

In the eyeball-projection display apparatus 1 according to the embodiment described here, the intermediate reflecting surface 30 of the reflecting element 3 has a planar shape so that the reflecting element 3 can easily have a low-profile configuration.

In the eyeball-projection display apparatus 1 according to the embodiment described here, the intermediate reflecting surface 30 of the reflecting element 3 may have a curved shape so that the reflecting element 3 has a higher degree of freedom in design.

In the eyeball-projection display apparatus 1 according to the embodiment described here, the intermediate reflecting surface 30 of the reflecting element 3 may have an aspheric curved shape so that the reflecting element 3 has a higher degree of freedom in design.

In the eyeball-projection display apparatus 1 according to the embodiment described here, the intermediate reflecting surface 30 of the reflecting element 3 may have a non-rotationally symmetric aspheric shape having a total of two symmetric surfaces at most so that the reflecting element 3 has a higher degree of freedom in design.

In the eyeball-projection display apparatus 1 according to the embodiment described here, the reflecting element 3 may have a diffracting surface shape so that the reflecting element 3 has a higher degree of freedom in design.

In the eyeball-projection display apparatus 1 according to the embodiment described here, suppose that the Z-axis is defined by an axis along the center chief ray Lc exiting out from the virtual image projection optical system 10. Then, the intermediate reflecting surface 30 of the reflecting element 3 satisfies the following condition (3):

$$-30°<\theta<10° \quad (3)$$

where θ is an angle between a tangent plane in a position of passage of the center chief ray Lc at the intermediate reflecting surface 30 of the reflecting surface 3 and a plane vertical to the Z-axis, with a negative sign in the case where the tangent plane tilts in a direction coming closer to the viewer side as it is spaced more away from the Z-axis in a side of the position of passage of the center chief ray Lc with respect to the Z-axis.

By satisfaction of Condition (3), it is possible to make the layout of the optical apparatus compact while avoiding any interference of the viewer's face with the off-axis light beams even at a wide angle of view. It is also possible to reduce the weight and size of the whole optical system.

Being short of the lower limit to Condition (3) most likely causes the relay optical system 4 to be separate from the eyepiece optical system 2; so the whole optical system grows larger, resulting in difficulty making the optical system compact. Exceeding the upper limit to Condition (3) quite likely causes the relay optical system 4 to come close to the eyepiece optical system 2, ending up with interference of the eyepiece optical system 2 with the relay optical system 4.

In the eyeball-projection display apparatus 1 according to the embodiment described here, the prism optical element 40 of the relay optical system 4 includes at least three optical surfaces, and the at least three optical surfaces are decentered with respect to one another: any one of the optical surfaces is an incident surface 44 having transmission in a normal optical path, there is a non-rotationally symmetric concave reflecting surface 43 located in opposition to the incident surface 44, there is a non-rotationally symmetric convex reflecting surface 42 located in opposition to the concave reflecting surface 43, the incident surface 44 and concave reflecting surface 43 are decentered with respect to each other, and there is a transmitting surface 41 positioned on a side of the prism optical element 40 on which the distance between the incident surface 44 and the concave reflecting surface 43 grows long.

It is thus possible to make the relay optical system compact.

In the eyeball-projection display apparatus 1 according to the embodiment described here, any one of the optical surfaces forming the prism optical element 40 of the relay optical system 4 is a combined reflecting and transmitting surface in a normal optical path.

It is thus possible to make the relay optical system more compact.

In the eyeball-projection display apparatus 1 according to the embodiment described here, suppose that the Z-axis is defined by an axis along the center chief ray Lc exiting out from the virtual image projection optical system 10 and the YZ plane is defined by a plane including the Z-axis and the center chief ray Lc incident on and reflected off the eyepiece reflecting surface 22 of the eyepiece optical system 2, as mentioned above. Then, the display apparatus 1 satisfies the following condition (4):

$$5°<\theta 2min<\theta 2max<80° \quad (4)$$

where θ2min and θ2max stand for the minimum and maximum values of the angle of incidence of the chief ray on the YZ plane at the reflecting surface 30 of the reflecting element 3, respectively.

Figure 3A:
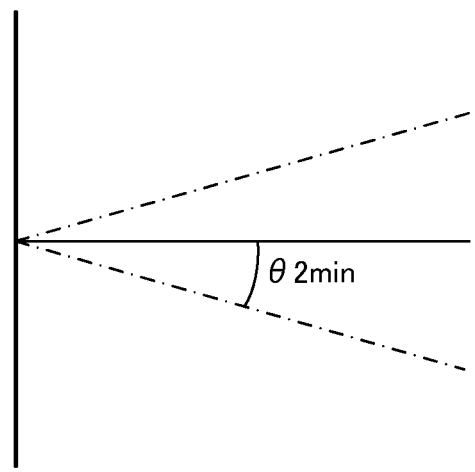
FIGS. 3A and 3B are enlarged views for IIIa and IIIb, respectively, appearing in FIG. 1.
Figure 3B:
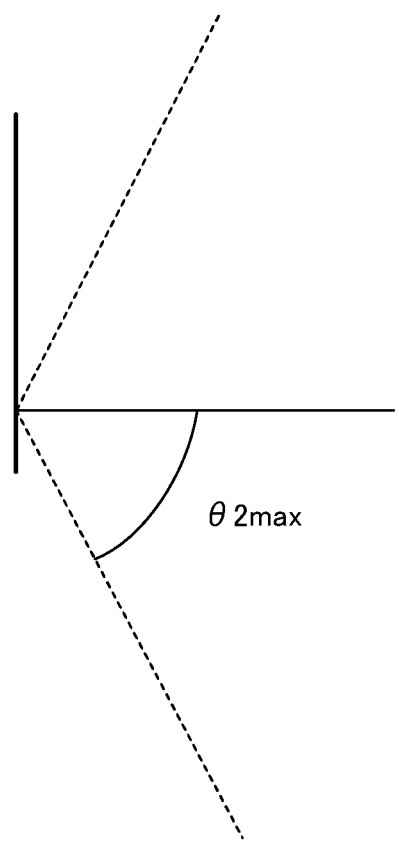

FIGS. 3A and 3B are enlarged views of IIIa and IIIb, respectively, appearing in FIG. 1: FIG. 3A is an enlarged view of IIIa indicating θ2min, and FIG. 3B is an enlarged view of IIIb indicating θ2max.

Satisfaction of Condition (4) makes sure an optical layout in favor of offering a tradeoff between size reductions and a wider field of view.

Being short of the lower limit to Condition (4) most likely causes the relay optical system 4 and eyepiece optical system 2 to come nearer to each other, giving rise to interference of the eyepiece optical system 2 with the relay optical system 4. Exceeding the upper limit to Condition (4) quite likely causes the eyepiece optical system 2 to grow larger.

The lower limit value of Condition (4) should be preferably 10° and more preferably 15°, while the upper limit value of Condition (4) should be preferably 70°, and more preferably 65°.

To make sure a wide angle of field, the eyeball-projection display apparatus 1 according to the embodiment described here satisfies the following condition (5):

$$35°<\theta 2max-\theta 2min<70° \quad (5)$$

Not being short of the lower limit to Condition (5) facilitates an optical layout having a wide field of view, and not exceeding the upper limit to Condition (5) makes it easy to prevent the virtual image projection optical system from growing larger.

The lower limit value of Condition (5) should be preferably 42° and more preferably 45°, while the upper limit value of Condition (5) should be preferably 60° and more preferably 50°.

In what follows, the eyeball-projection display apparatus 1 according to the embodiment described here will be explained with reference to some examples.

Figure 4:
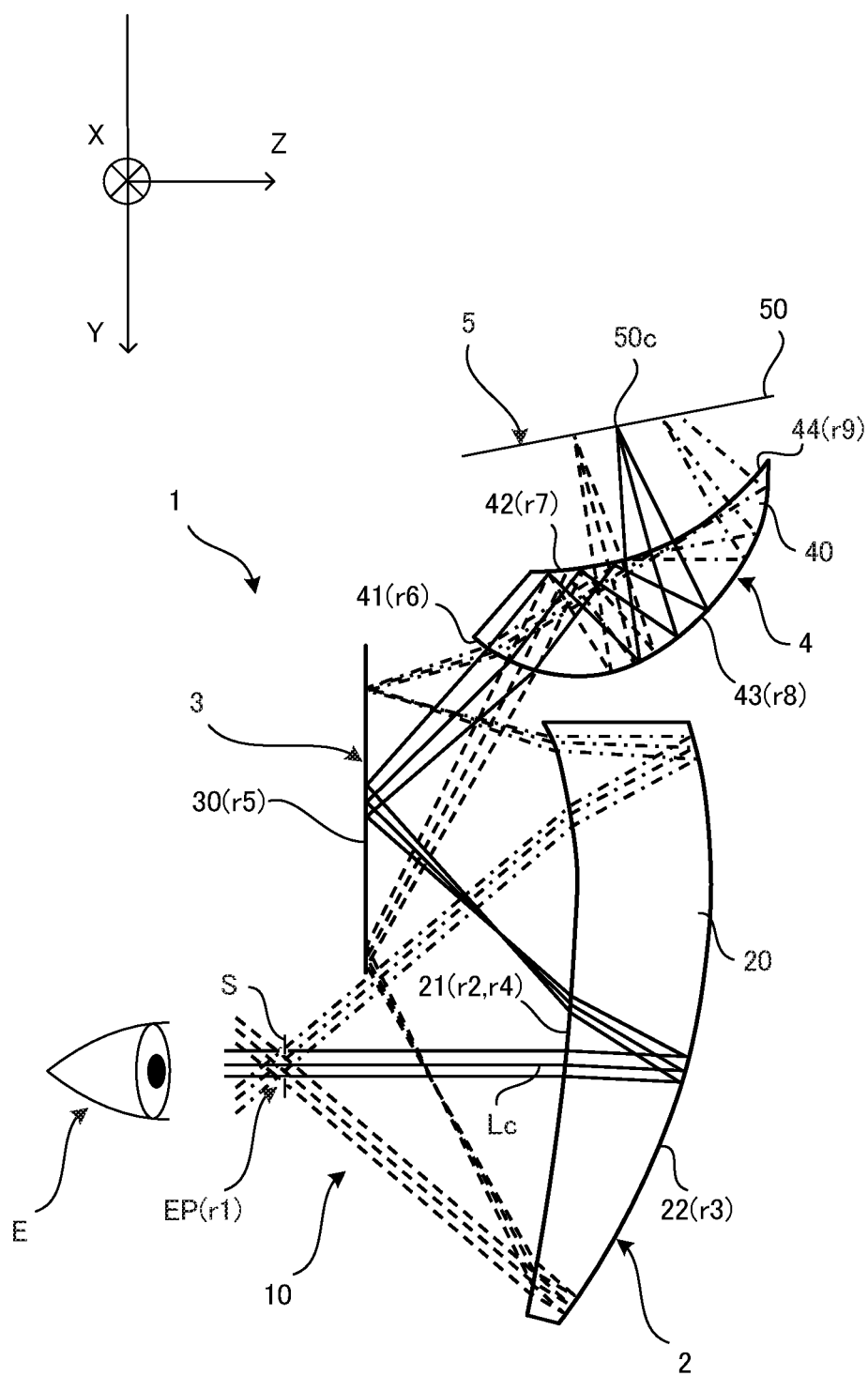
FIG. 4 is an optical path diagram in the Y-Z section for the eyeball-projection display apparatus of Example 1 according to one embodiment.
Figure 5:
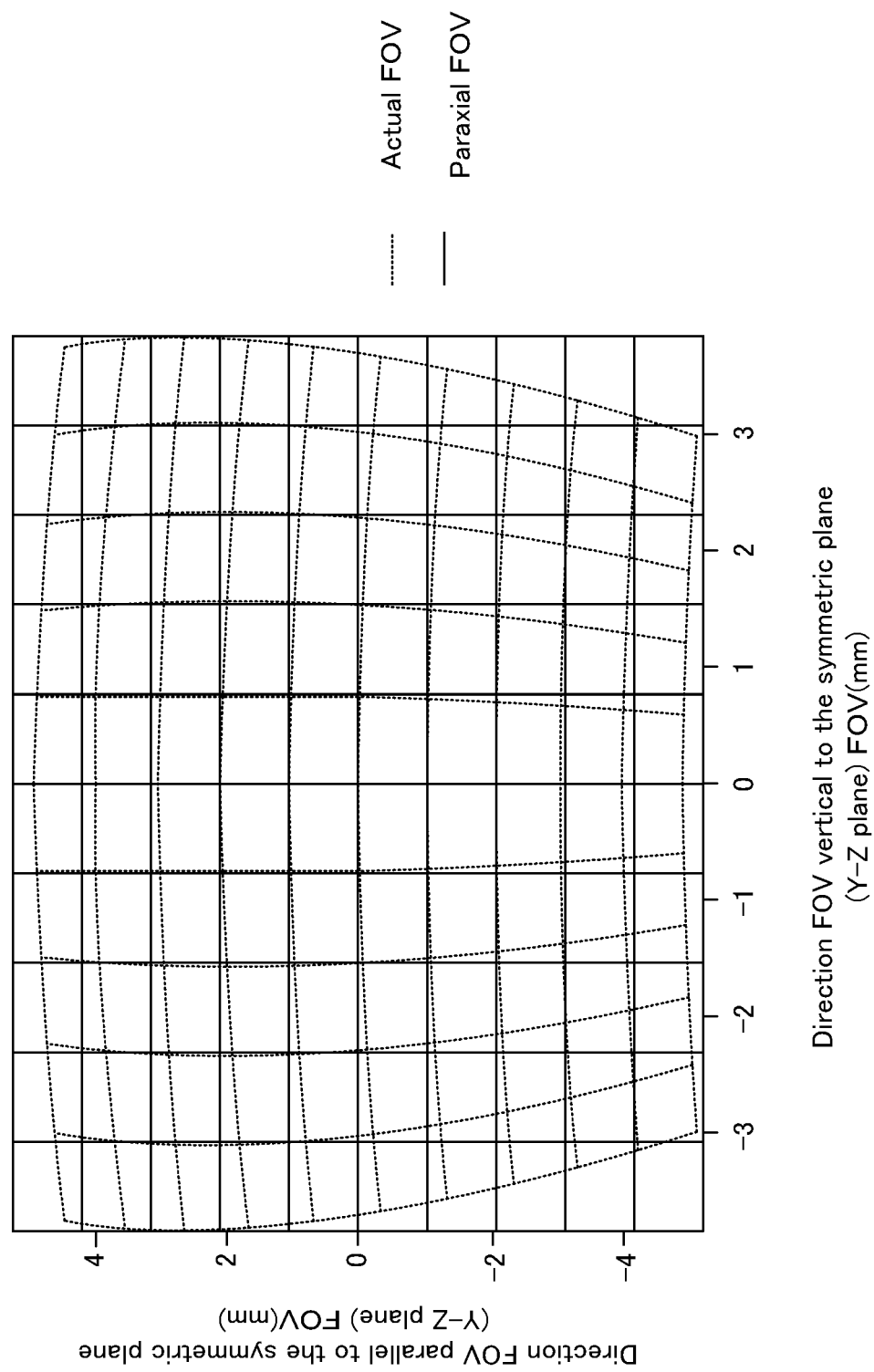
FIG. 5 is a distortion diagram upon back ray tracing for the eyeball-projection display apparatus of Example 1 according to one embodiment.

FIG. 4 is an optical path diagram in the Y-Z section for the eyeball-projection display apparatus 1 of Example 1 according to the embodiment described here, and FIG. 5 is a distortion diagram for the eyeball-projection display apparatus 1 of Example 1 according to the embodiment described here.

The eyeball-projection display apparatus 1 according to Example 1 includes an image display device 5 for showing an image, and a virtual image projection optical system 10 in which an image shown by the image display device 5 is optically guided into the eyeball E of a viewer for projection of a virtual image. The virtual image projection optical system 10 includes an eyepiece optical system 2 having an eyepiece optical element 20 including an eyepiece transmitting surface 21 and an eyepiece reflecting surface 22 for reflecting off a light ray incident from the eyepiece transmitting surface 21 and again guiding the light ray back into the same eyepiece transmitting surface 21, having a medium filled in between the eyepiece transmitting surface 21 and the eyepiece reflecting surface 22, the medium having a refractive index of greater than 1, and further including a back-surface reflecting mirror capable of only one reflection in an effective optical path and having a positive power; a relay optical system 4 having a positive power, the relay optical system 4 including a prism optical element 40 having a curved, internal-reflecting surface that is decentered with respect to a center chief ray, being filled in with a medium having a refractive index of greater than 1 and being capable of plural internal reflections, and receiving light from the image display device 5 for projection of an intermediate image of the image onto an exit side of the apparatus 1; and a reflecting element 3 that is positioned in an optical path between the eyepiece optical system 2 and the relay optical system 4 and includes an intermediate reflecting surface 30 to reflect a light beam incident obliquely from a side of the apparatus 1, on which the relay optical system 4 is located, toward a side of the apparatus 1, on which the eyepiece optical system 2 is located, thereby deflecting an optical path through the apparatus 1.

In the eyeball-projection display apparatus 1 according to Example 1, the prism optical element 40 of the relay optical system 4 includes three optical surfaces that are decentered with respect to one another: any one of the optical surfaces is an incident surface 44 having transmission in a normal optical path, there is a non-rotationally symmetric concave reflecting surface 43 located in opposition to the incident surface 44, there is a non-rotationally symmetric convex reflecting surface 42 located in opposition to the concave reflecting surface 43, the incident surface 44 and concave reflecting surface 43 are decentered with respect to each other, and there is a transmitting surface 41 positioned on a side of the prism optical element 40 on which the distance between the incident surface 44 and the concave reflecting surface 43 grows long. Note here that the incident surface 44 and convex reflecting surface 42 are a combination surface.

The eyepiece transmitting surface 21 and reflecting surface 22 of the eyepiece optical system 2 as well as the transmitting surface 41, convex reflecting surface 42, concave reflecting surface 43 and incident surface 44 of the relay optical system 4 are each defined by a free-form surface that is a rotationally asymmetric surface. Note here that the free-form surface is designed in the form of a curved surface having the YZ plane as only one symmetric plane, and that the intermediate reflecting surface 30 of the reflecting element 3 is a plane.

Referring to the eyeball-projection display apparatus 1 of Example 1 in terms of back ray tracing, light exiting out from the eyeball E of the virtual viewer is incident on the eyepiece optical element 20 of the eyepiece optical system 2 through the exit pupil EP. Then, the light incident on the eyepiece optical element 20 from the eyepiece transmitting surface 21 is reflected off the eyepiece reflecting surface 22, exiting out from the eyepiece transmitting surface 21. Then, the light exiting out from the eyepiece optical element 20 is reflected off the intermediate reflecting surface 30 of the reflecting element 3. Then, the light reflected off the intermediate reflecting surface 30 is incident on the prism optical element 40 of the relay optical system 4. Then, the light incident on the prism optical element 40 is reflected off the convex reflecting surface 42 and concave reflecting surface 43, exiting out from the incident surface 44. Then, the light exiting out from the prism optical element 40 is incident on the screen 50 of the image display device 5.

Figure 6:
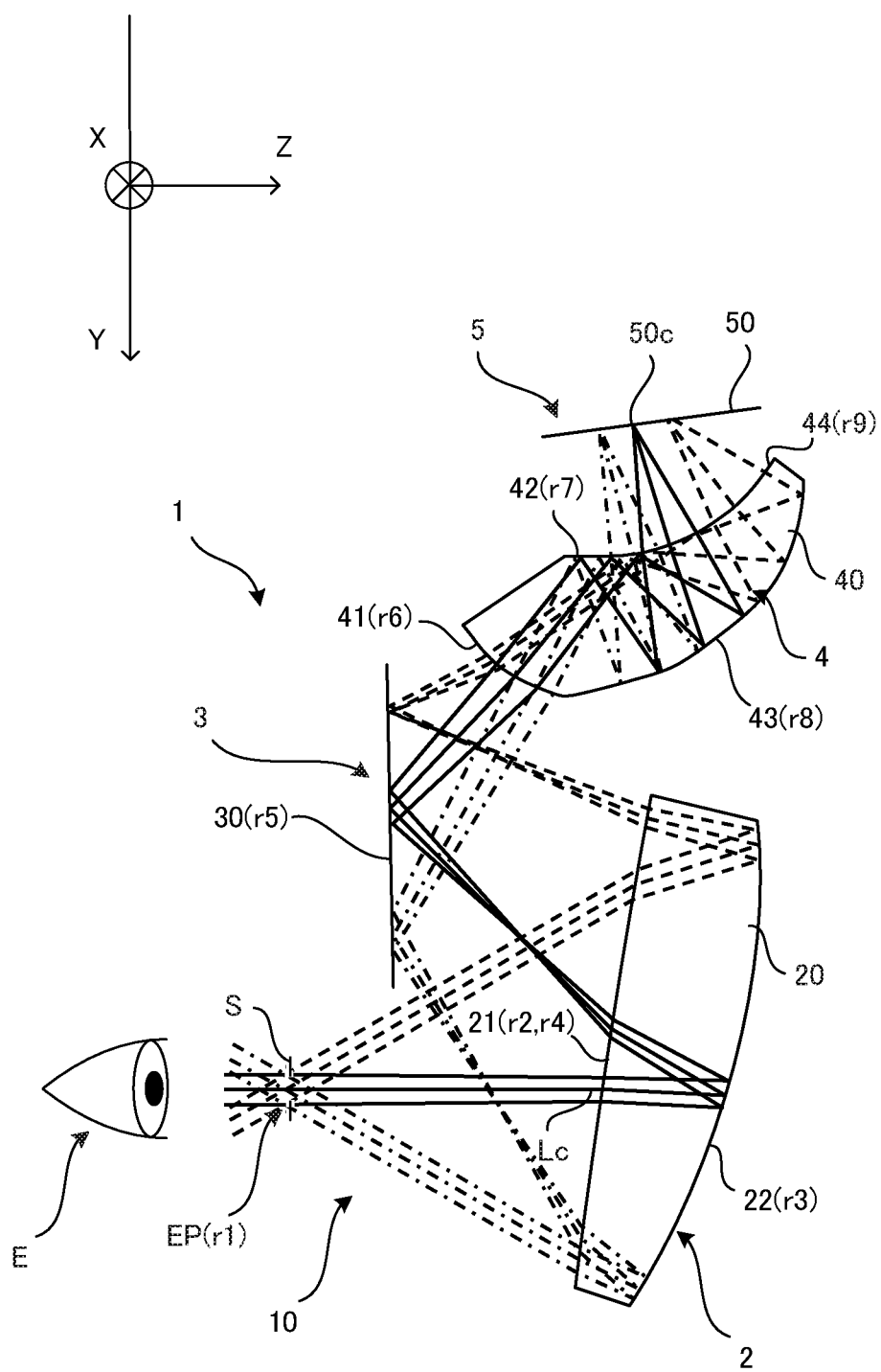
FIG. 6 is an optical path diagram in the Y-Z section for the eyeball-projection display apparatus of Example 2 according to one embodiment.
Figure 7:
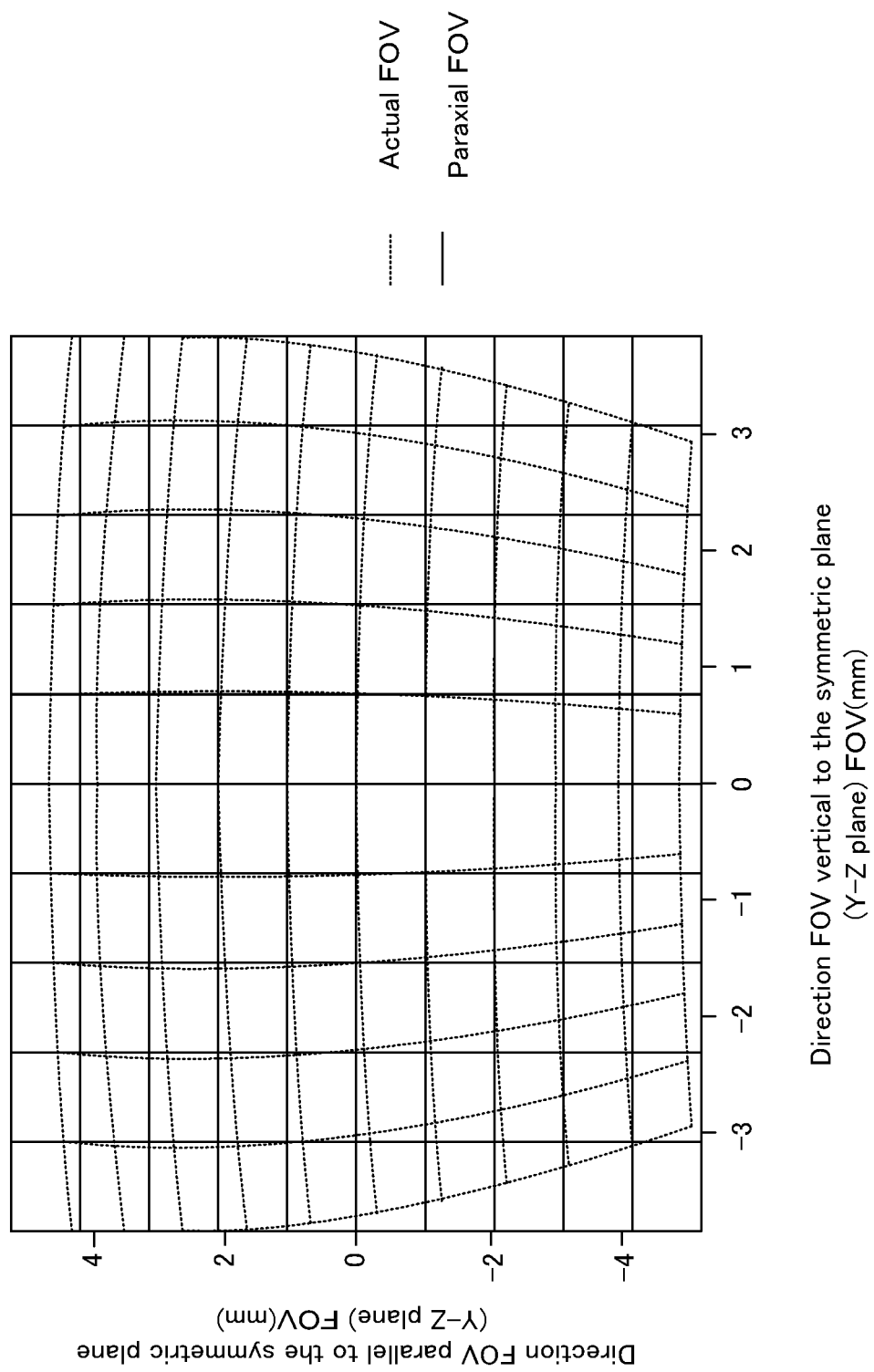
FIG. 7 is a distortion diagram upon back ray tracing for the eyeball-projection display apparatus of Example 2 according to one embodiment.

FIG. 6 is an optical path diagram in the Y-Z section for the eyeball-projection display apparatus 1 of Example 2 according to the embodiment described here, and FIG. 7 is a distortion diagram for the eyeball-projection display apparatus 1 of Example 2 according to the embodiment described here.

The eyeball-projection display apparatus 1 according to Example 2 includes an image display device 5 for showing an image, and a virtual image projection optical system 10 in which an image shown by the image display device 5 is optically guided into the eyeball E of a viewer for projection of a virtual image. The virtual image projection optical system 10 includes an eyepiece optical system 2 having an eyepiece optical element 20 including an eyepiece transmitting surface 21 and an eyepiece reflecting surface 22 for reflecting off a light ray incident from the eyepiece transmitting surface 21 and again guiding the light ray back into the same eyepiece transmitting surface 21, having a medium filled in between the eyepiece transmitting surface 21 and the eyepiece reflecting surface 22, the medium having a refractive index of greater than 1, and further including a back-surface reflecting mirror capable of only one reflection in an effective optical path and having a positive power; a relay optical system 4 having a positive power, the relay optical system 4 including a prism optical element 40 having a curved, internal-reflecting surface that is decentered with respect to a center chief ray, being filled in with a medium having a refractive index of greater than 1 and being capable of plural internal reflections, and receiving light from the image display device 5 for projection of an intermediate image of the image onto an exit side of the apparatus 1; and a reflecting element 3 that is positioned in an optical path between the eyepiece optical system 2 and the relay optical system 4 and includes an intermediate reflecting surface 30 to reflect a light beam incident obliquely from a side of the apparatus 1, on which the relay optical system 4 is located, toward a side of the apparatus 1, on which the eyepiece optical system 2 is located, thereby deflecting an optical path through the apparatus 1.

In the eyeball-projection display apparatus 1 according to Example 1, the prism optical element 40 of the relay optical system 4 includes three optical surfaces that are decentered with respect to one another: any one of the optical surfaces is an incident surface 44 having transmission in a normal optical path, there is a non-rotationally symmetric concave reflecting surface 43 located in opposition to the incident surface 44, there is a non-rotationally symmetric convex reflecting surface 42 located in opposition to the concave reflecting surface 43, the incident surface 44 and concave reflecting surface 43 are decentered with respect to each other, and there is a transmitting surface 41 positioned on a side of the prism optical element 40 on which the distance between the incident surface 44 and the concave reflecting surface 43 grows long. Note here that the incident surface 44 and convex reflecting surface 42 are a combination surface.

The eyepiece transmitting surface 21 of the eyepiece optical system 2 is defined by a Fresnel lens surface acting as a rotationally asymmetric surface, and the eyepiece reflecting surface 22 of the eyepiece optical system 2 is defined by an aspheric surface acting as a rotationally asymmetric surface. The intermediate reflecting surface 30 of the reflecting element 3 as well as the transmitting surface 41, convex reflecting surface 42, concave reflecting surface 43 and incident surface 44 of the prism optical element 40 of the relay optical system 4 are each defined by a free-form surface acting as a rotationally asymmetric surface.

Referring to the eyeball-projection display apparatus 1 of Example 2 in terms of back ray tracing, light exiting out from the eyeball E of the virtual viewer is incident on the eyepiece optical element 20 of the eyepiece optical system 2 through the exit pupil EP. Then, the light incident on the eyepiece optical element 20 from the eyepiece transmitting surface 21 is reflected off the eyepiece reflecting surface 22, exiting out from the eyepiece transmitting surface 21. Then, the light exiting out from the eyepiece optical element 20 is reflected off the intermediate reflecting surface 30 of the reflecting element 3. Then, the light reflected off the intermediate reflecting surface 30 is incident on the prism optical element 40 of the relay optical system 4. Then, the light incident on the prism optical element 40 is reflected off the convex reflecting surface 42 and concave reflecting surface 43, exiting out from the incident surface 44. Then, the light exiting out from the prism optical element 40 is incident on the screen 50 of the image display device 5.

Figure 8:
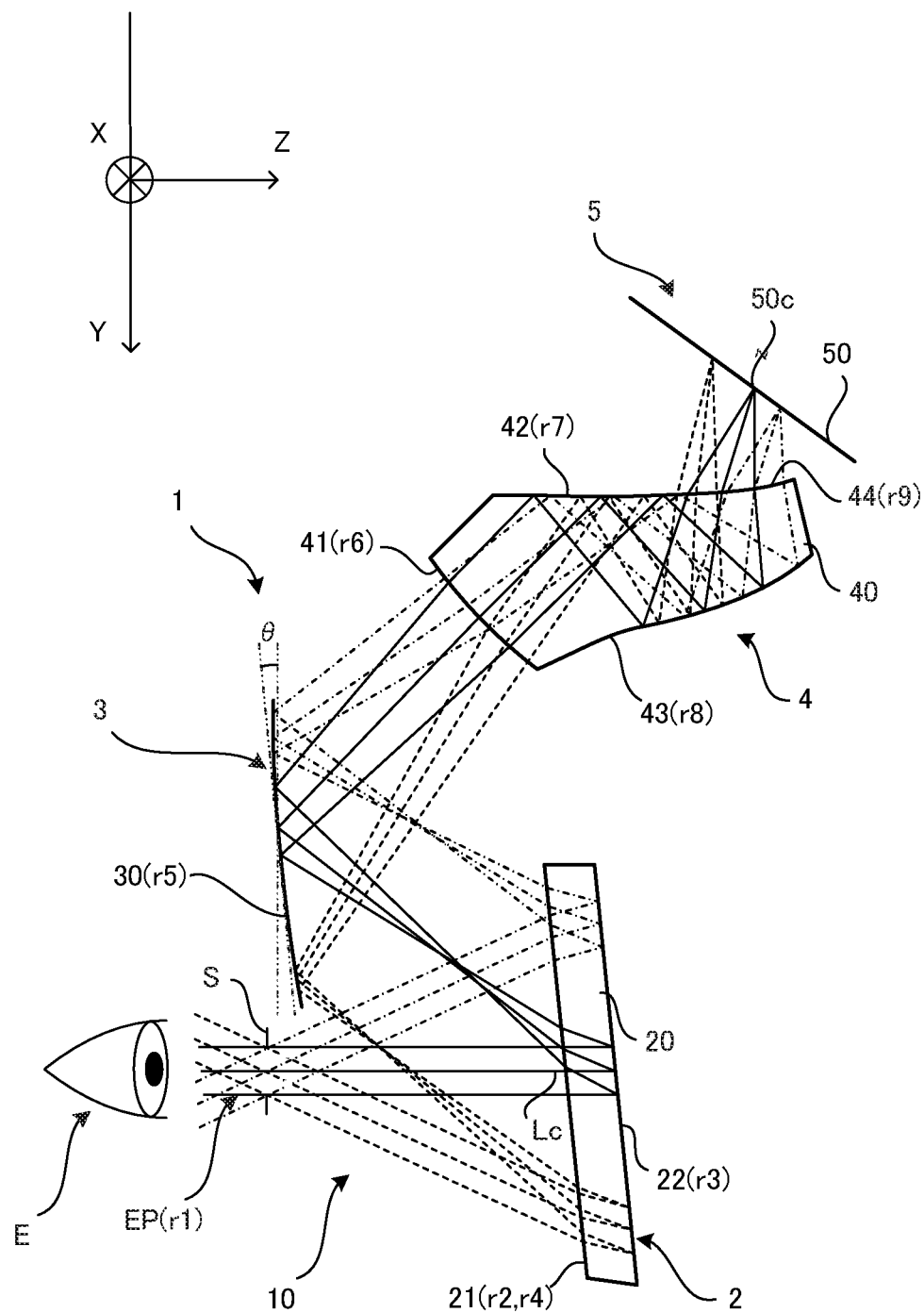
FIG. 8 is an optical path diagram in the Y-Z section for the eyeball-projection display apparatus of Example 3 according to one embodiment.

FIG. 8 is an optical path diagram in the Y-Z section for the eyeball-projection display apparatus 1 of Example 3 according to the embodiment described here.

The eyeball-projection display apparatus 1 according to Example 3 includes an image display device 5 for showing an image, and a virtual image projection optical system 10 in which an image shown by the image display device 5 is optically guided into the eyeball E of a viewer for projection of a virtual image. The virtual image projection optical system 10 includes an eyepiece optical system 2 having an eyepiece optical element 20 including an eyepiece transmitting surface 21 and an eyepiece reflecting surface 22 for reflecting off a light ray incident from the eyepiece transmitting surface 21 and again guiding the light ray back into the same eyepiece transmitting surface 21, having a medium filled in between the eyepiece transmitting surface 21 and the eyepiece reflecting surface 22, the medium having a refractive index of greater than 1, and further including a back-surface reflecting mirror capable of only one reflection in an effective optical path and having a positive power; a relay optical system 4 having a positive power, the relay optical system 4 of a positive power including a prism optical element 40 having a curved, internal-reflecting surface that is decentered with respect to a center chief ray, being filled in with a medium having a refractive index of greater than 1 and being capable of plural internal reflections, and receiving light from the image display device 5 for projection of an intermediate image of the image onto an exit side of the apparatus 1; and a reflecting element 3 that is positioned in an optical path between the eyepiece optical system 2 and the relay optical system 4 and includes an intermediate reflecting surface 30 to reflect a light beam incident obliquely from a side of the apparatus 1, on which the relay optical system 4 is located, toward a side of the apparatus 1, on which the eyepiece optical system 2 is located, thereby deflecting an optical path through the apparatus 1.

In the eyeball-projection display apparatus 1 according to Example 3, the prism optical element 40 of the relay optical system 4 includes three optical surfaces that are decentered with respect to one another: any one of the optical surfaces is an incident surface 44 having transmission in a normal optical path, there is a non-rotationally symmetric concave reflecting surface 43 located in opposition to the incident surface 44, there is a non-rotationally symmetric convex reflecting surface 42 located in opposition to the concave reflecting surface 43, the incident surface 44 and concave reflecting surface 43 are decentered with respect to each other, and there is a transmitting surface 41 positioned on a side of the prism optical element 40 on which the distance between the incident surface 44 and the concave reflecting surface 43 grows long. Note here that the incident surface 44 and convex reflecting surface 42 are a combination surface.

The eyepiece transmitting surface 21 of the eyepiece optical system 2 is defined by a Fresnel lens surface acting as a rotationally asymmetric surface, and the eyepiece reflecting surface 22 of the eyepiece optical system 2 is defined by a diffracting optical surface acting as a rotationally asymmetric surface. The transmitting surface 41, convex reflecting surface 42, concave reflecting surface 43 and incident surface 44 of the prism optical element 40 of the relay optical system 4 are each defined by a free-form surface acting as a rotationally asymmetric surface. The intermediate reflecting surface 30 of the reflecting element 3 is a spherical surface that is concave on the optical path side. In the eyeball-projection display apparatus 1 according to the Example 3 described here, suppose that the Z-axis is defined by an axis along the center chief ray Lc exiting out from the virtual image projection optical system 10. Then, the intermediate reflecting surface 30 of the reflecting element 3 satisfies the following condition (3):

$$-30°<\theta<10° \quad (3)$$

where θ is an angle between a tangent plane in a position of passage of the center chief ray Lc at the intermediate reflecting surface 30 of the reflecting surface 3 and a plane vertical to the Z-axis, with a negative sign in the case where the tangent plane tilts in a direction coming closer to the viewer side as it is spaced more away from the Z-axis in a side of the position of passage of the center chief ray Lc with respect to the Z-axis.

Referring to the eyeball-projection display apparatus 1 of Example 3 in terms of back ray tracing, light exiting out from the eyeball E of the virtual viewer is incident on the eyepiece optical element 20 of the eyepiece optical system 2 through the exit pupil EP. Then, the light incident on the eyepiece optical element 20 from the eyepiece transmitting surface 21 is reflected off the eyepiece reflecting surface 22, exiting out from the eyepiece transmitting surface 21. Then, the light exiting out from the eyepiece optical element 20 is reflected off the intermediate reflecting surface 30 of the reflecting element 3. Then, the light reflected off the intermediate reflecting surface 30 is incident on the prism optical element 40 of the relay optical system 4. Then, the light incident on the prism optical element 40 is reflected off the convex reflecting surface 42 and concave reflecting surface 43, exiting out from the incident surface 44. Then, the light exiting out from the prism optical element 40 is incident on the screen 50 of the image display device 5.

Comprehensively, the planar Fresnel lens surface or diffracting optical surface may be made up of a holographic optical surface. By use of the Fresnel lens surface, diffracting optical surface, holographic optical surface or the like, the eyepiece optical system 2 may not only be configured in the form of a plane-parallel plate but also be located vertically to the exiting center chief ray Lc, working in favor of apparatus design, and so on.

Figure 9:
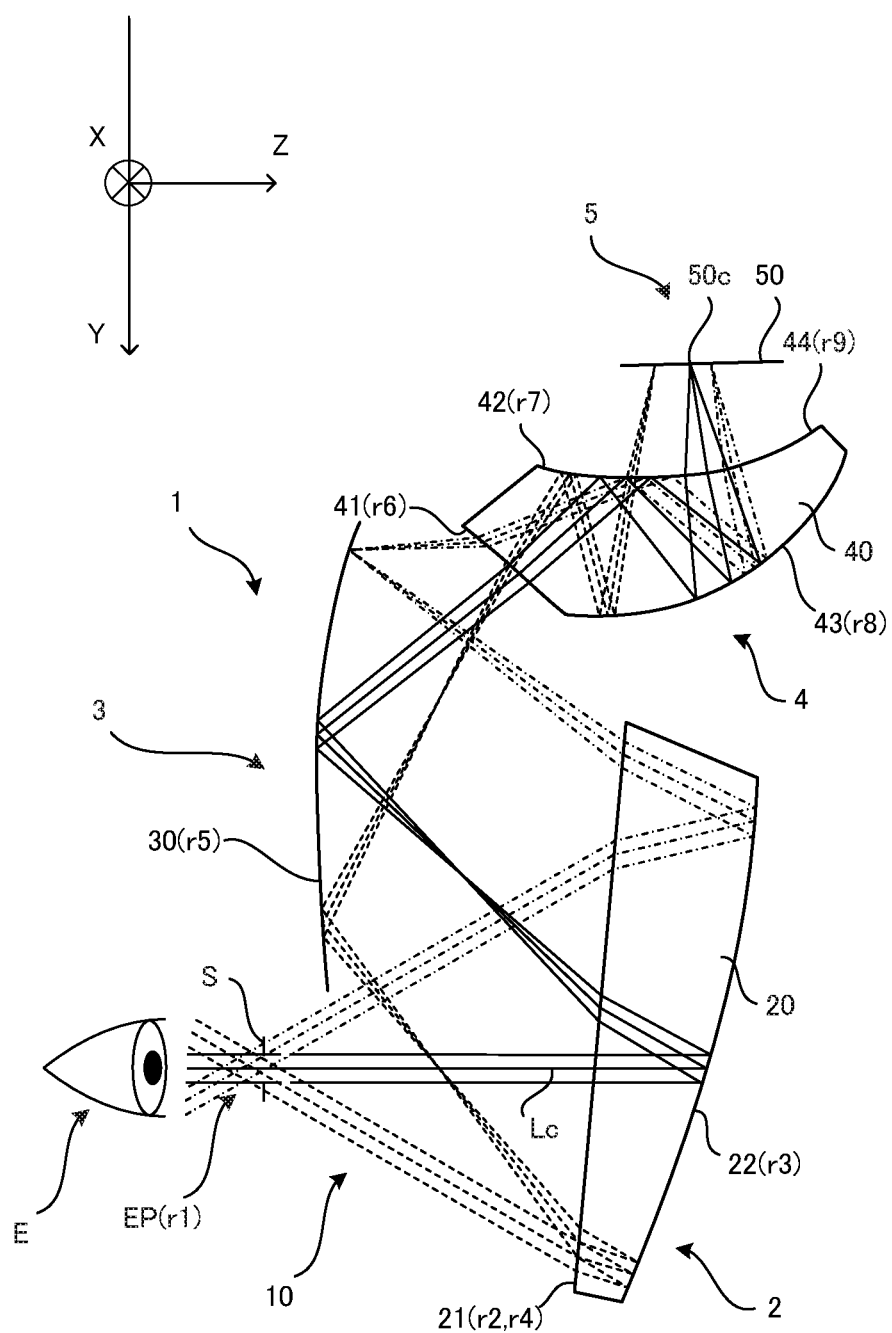
FIG. 9 is an optical path diagram in the Y-Z section for the eyeball-projection display apparatus of Example 4 according to one embodiment.
Figure 10:
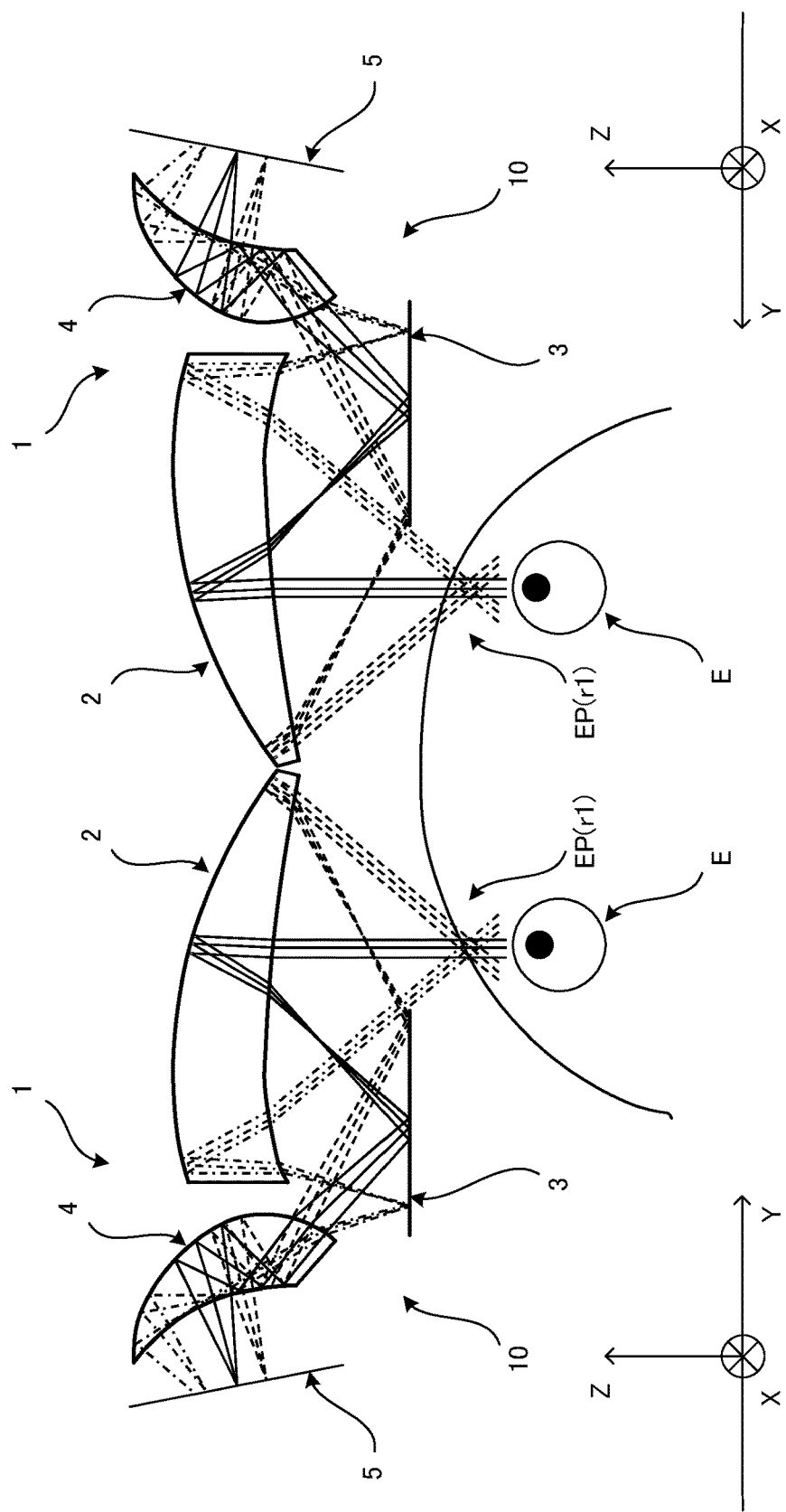
FIG. 10 is illustrative in conception of the eyeball-projection display apparatus according to one embodiment, which is positioned laterally or sideways relative to the viewer's head.

FIG. 9 is an optical path diagram in the Y-Z section for the eyeball-projection display apparatus 1 of Example 4 according to one embodiment.

The eyeball-projection display apparatus 1 according to Example 4 includes an image display device 5 for showing an image, and a virtual image projection optical system 10 in which an image shown by the image display device 5 is optically guided into the eyeball E of a viewer for projection of a virtual image. The virtual image projection optical system 10 includes an eyepiece optical system 2 having an eyepiece optical element 20 including an eyepiece transmitting surface 21 and an eyepiece reflecting surface 22 for reflecting off a light ray incident from the eyepiece transmitting surface 21 and again guiding the light ray back into the same eyepiece transmitting surface 21, having a medium filled in between the eyepiece transmitting surface 21 and the eyepiece reflecting surface 22, the medium having a refractive index of greater than 1, and further including a back-surface reflecting mirror capable of only one reflection in an effective optical path and having a positive power; a relay optical system 4 having a positive power, the relay optical system 4 of a positive power including a prism optical element 40 having a curved, internal-reflecting surface that is decentered with respect to a center chief ray, being filled in with a medium having a refractive index of greater than 1 and being capable of plural internal reflections, and receiving light from the image display device 5 for projection of an intermediate image of the image onto an exit side of the apparatus 1; and a reflecting element 3 that is positioned in an optical path between the eyepiece optical system 2 and the relay optical system 4 and includes an intermediate reflecting surface 30 to reflect a light beam incident obliquely from a side of the apparatus 1, on which the relay optical system 4 is located, toward a side of the apparatus 1, on which the eyepiece optical system 2 is located, thereby deflecting an optical path through the apparatus 1.

In the eyeball-projection display apparatus 1 according to Example 4, the prism optical element 40 of the relay optical system 4 includes three optical surfaces that are decentered with respect to one another: any one of the optical surfaces is an incident surface 44 having transmission in a normal optical path, there is a non-rotationally symmetric concave reflecting surface 43 located in opposition to the incident surface 44, there is a non-rotationally symmetric convex reflecting surface 42 located in opposition to the concave reflecting surface 43, the incident surface 44 and concave reflecting surface 43 are decentered with respect to each other, and there is a transmitting surface 41 positioned on a side of the prism optical element 40 on which the distance between the incident surface 44 and the concave reflecting surface 43 grows long. Note here that the incident surface 44 and convex reflecting surface 42 are a combination surface.

The eyepiece transmitting surface 21 of the eyepiece optical system 2 is defined by a Fresnel lens surface acting as a rotationally asymmetric surface, and the eyepiece reflecting surface 22 of the eyepiece optical system 2 is defined by a holographic optical surface acting as a rotationally asymmetric surface. The intermediate reflecting surface 30 of the reflecting element 3 as well as the transmitting surface 41, convex reflecting surface 42, concave reflecting surface 43 and incident surface 44 of the prism optical element 40 of the relay optical system 4 are each defined by a free-form surface acting as a rotationally asymmetric surface.

Referring to the eyeball-projection display apparatus 1 of Example 4 in terms of back ray tracing, light exiting out from the eyeball E of the virtual viewer is incident on the eyepiece optical element 20 of the eyepiece optical system 2 through the exit pupil EP. Then, the light incident on the eyepiece optical element 20 from the eyepiece transmitting surface 21 is reflected off the eyepiece reflecting surface 22, exiting out from the eyepiece transmitting surface 21. Then, the light exiting out from the eyepiece optical element 20 is reflected off the intermediate reflecting surface 30 of the reflecting element 3. Then, the light reflected off the intermediate reflecting surface 30 is incident on the prism optical element 40 of the relay optical system 4. Then, the light incident on the prism optical element 40 from the transmitting surface 41 is reflected off the convex reflecting surface 42 and concave reflecting surface 43, exiting out from the incident surface 44. Then, the light exiting out from the prism optical element 40 is incident on the screen 50 of the image display device 5.

The setup parameters of Examples 1 and 2 as mentioned above are set out below. Note here that the abbreviations "FFS", "FRE" and "ASP" in the following tables stand for a free-form surface, a Fresnel surface and an aspheric surface, respectively.

The setup parameters of these optical systems to be given below are based on the results of back ray tracing where light rays passing through the dummy surface of the virtual image projection optical system 10 defined by the position E (pupil position) where the viewer takes a look, as typically shown in FIG. 1, travel toward the image display device 5 by way of the virtual image projection optical system 10.

The coordinate system is here supposed on projection of a virtual image from the exit pupil 1000 mm ahead in the Z-axis positive direction while there is the viewing position E of the viewer overlapping with the exit pupil EP. Then, the origin of the decentered optical surface of the decentered optical system is defined as a point that is positioned from the point of intersection of the EP plane with the center chief ray Lc 10 mm ahead in the Z-axis positive direction. The Z-axis positive direction is defined by the direction of the center chief ray Lc from this origin toward the side of the virtual image projection optical system 10, the Y-axis positive direction is defined by a direction that is orthogonal to the Z-axis from the origin and on the side of the apparatus opposite to the image display device 5, and the Y-Z plane is defined within the sheet plane of FIG. 1. Then, the X-axis positive direction is defined by an axis that forms a left-handed orthogonal coordinate system with the Y-axis and Z-axis.

Given to each decentered surface are the amount of decentration of the coordinate system, on which that surface is defined, from the center of the origin (eye point EP) of the optical system (X, Y and Z in the X-, Y- and Z-axis directions) and the angles ($\alpha$, $\beta$, $\gamma$ (°)) of tilt of the coordinate system for defining each surface about the X-, Y- and Z-axes of the coordinate system defined on the origin of the optical system. In that case, the positive $\alpha$ and $\beta$ mean counterclockwise rotation with respect to the positive directions of the respective axes, and the positive $\gamma$ means clockwise rotation with respect to the positive direction of the Z-axis. Referring here to how to rotate the center axis of each surface in the directions $\alpha$, $\beta$ and $\gamma$, it is first $\alpha$ rotated counterclockwise (clockwise on the sheet plane) about the X-axis of the coordinate system defined on the origin of the optical system, then $\beta$ rotated counterclockwise about the Y-axis of the ensuing new coordinate system, and then $\gamma$ rotated clockwise about the Z-axis of the ensuing another new coordinate system.

When a specific surface of the optical function surfaces forming the optical system of each example and the subsequent surface form together a coaxial optical system, there is a surface separation given. Besides, the radii of curvature of the surfaces, and the refractive indices and Abbe constants of the media are given as usual.

It is also noted that coefficient terms to which no data are given in the following setup parameters are zero. The refractive indices and Abbe constants on a d-line basis (587.56 nm wavelength) are given, and length is given in mm. The decentration of each surface is represented by the quantity of decentration from the reference surface, as mentioned above.

The surface shape of the free-form surface used in the embodiments is defined by the following formula (a). Note here that the Z-axis in that defining formula stands for the axis of the free-form surface.

$$Z = (r^2/R)[1 + \sqrt{\{1 - (1+k)(r/R^2)\}}] + \sum_{j=1}^{\infty} C_j X^m Y^n \quad (a)$$

Here the first term of Formula (a) is the spherical term, and the second term is the free-form surface term.

In the spherical term,

R is the radius of curvature of the apex, k is the conic constant, and r is $\sqrt{(X^2+Y^2)}$.

The free-form surface term is:

$$\sum_{j=1}^{66} C_j X^m Y^n =$$

$$C_1 + C_2 X + C_3 Y + C_4 X^2 + C_5 XY + C_6 Y^2 + C_7 X^3 + C_8 X^2 Y + C_9 XY^2 +$$
$$C_{10} Y^3 + C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 + C_{20} XY^4 + C_{21} Y^5 +$$
$$C_{22} X^6 + C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ is a coefficient (j is an integer greater than 1).

Generally, although the free-form surface has not possibly a plane of symmetry in both the X-Z and Y-Z planes, yet it will have only one plane of symmetry parallel with the Y-Z plane by reducing all the odd-numbered terms for X down to zero. For instance, this may be achieved by reducing the coefficients $C_2$, $C_5$, $C_7$, $C_9$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ . . . in the defining formula (a) down to zero.

Also, by reducing all the odd-numbered terms for Y down to zero, for instance, by reducing $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ . . . in the defining formula down to zero, the free-form surface will have only one plane of symmetry parallel with the X-Z plane.

If the optical system is decentered in any one direction of the planes of symmetry, for instance, the Y-axis direction with respect to the plane of symmetry parallel with the Y-Z plane, and the X-axis direction with respect to the plane of symmetry parallel with the X-Z plane, it is then possible to improve assembling capability while making effective correction for rotationally asymmetric aberrations occurring from decentration.

It is here to be noted that the defining formula (a) is provided for the purpose of illustration alone. The free-form surface according to the invention has a feature of using a rotationally asymmetric surface thereby making correction for rotationally asymmetric aberrations occurring from decentration while, at the same time, improving assembling capabilities. As a matter of course, the same effect is achievable for any other defining formula too.

Further, there are data about aspheric lens surfaces included in the aspheric data. The aspheric surface shape is given by the following formula provided that z is an optical axis with the direction of travel of light taken as positive and y is a direction orthogonal to the optical axis.

$$z=(y^2/r)/[1+\{1-(1+k)\cdot(y/r)^2\}^{1/2}]+A4y^4+A6y^6+A8y^8+A10y^{10}$$

Note here that r is the paraxial radius of curvature, k is the conic coefficient and A4, A6 and A8 are the $4^{th}$, $6^{th}$ and $8^{th}$-order aspheric coefficients, and that the symbol "e" indicates that the numerical value subsequent to it is a power exponent with 10 as a base; for instance "1.0e−5" stands for "$1.0\times10^{-5}$".

EXAMPLE 1

| Surface No. | Radius of Curvature | Surface Separation | Decentration | Refractive Index | Abbe Constant |
|---|---|---|---|---|---|
| Object Surface | ∞ (Dummy Surface) | −1000.00 | | | |
| r1 | ∞ (Exit Pupil) | 10.00 | | | |
| r2 | FFS[1] | 0.00 | Decentration(1) | 1.53 | 55.00 |
| r3 | FFS[2] | 0.00 | Decentration(2) | 1.53 | 55.00 |
| r4 | FFS[1] | 0.00 | Decentration(1) | | |
| r5 | ∞ | 0.00 | Decentration(3) | | |
| r6 | FFS[3] | 0.00 | Decentration(4) | 1.53 | 55.00 |
| r7 | FFS[4] | 0.00 | Decentration(5) | 1.53 | 55.00 |
| r8 | FFS[5] | 0.00 | Decentration(6) | 1.53 | 55.00 |
| r9 | FFS[4] | 0.00 | Decentration(5) | | |
| Image Plane | ∞ | 0.00 | Decentration(7) | | |

FFS[1]

| R = | 1477.33 | | | | |
|---|---|---|---|---|---|
| k = | −3.576930221 | | | | |
| C4 | 3.98e−03 | C6 | −8.45e−04 | C8 | −6.42e−05 |
| C10 | 1.36e−06 | C11 | −3.11e−06 | C13 | −4.70e−08 |
| C15 | −7.94e−07 | C17 | 1.53e−08 | C19 | 5.78e−09 |
| C21 | 2.57e−09 | C22 | 4.47e−10 | C24 | 5.00e−10 |
| C26 | 1.07e−10 | C28 | 7.40e−11 | | |

FFS[2]

| R = | −150.06 | | | | |
|---|---|---|---|---|---|
| k = | −0.69151889 | | | | |
| C4 | 7.32e−04 | C6 | −1.79e−03 | C8 | −1.38e−06 |
| C10 | 6.09e−08 | C11 | −9.95e−08 | C13 | −5.29e−07 |
| C15 | −9.67e−08 | C17 | −1.72e−08 | C19 | −3.04e−10 |
| C21 | −8.96e−11 | C22 | 8.83e−12 | C24 | 1.24e−10 |
| C26 | 1.49e−11 | C28 | −1.05e−11 | | |

FFS[3]

| R = | ∞ | | | | |
|---|---|---|---|---|---|
| k = | 0 | | | | |
| C4 | −0.004331 | C6 | 0.028016 | C8 | 0.0029459 |
| C10 | −0.000262 | C11 | −4.67e−05 | C13 | −0.0003002 |
| C15 | 1.84e−05 | C17 | 6.72e−06 | C19 | 1.56e−05 |
| C21 | −6.14e−07 | C22 | −6.62e−08 | C24 | −2.78e−07 |
| C26 | −3.04e−07 | C28 | 2.32e−08 | | |

FFS[4]

| R = | ∞ | | | | |
|---|---|---|---|---|---|
| k = | 0 | | | | |
| C4 | 1.45e−02 | C6 | 8.52e−03 | C8 | −2.00e−05 |
| C10 | −9.66e−05 | C11 | 1.75e−06 | C13 | −7.66e−06 |
| C15 | 4.97e−06 | C17 | 4.61e−07 | C19 | 9.12e−07 |
| C21 | −2.73e−08 | C22 | −8.74e−09 | C24 | −1.82e−08 |
| C26 | −1.92e−08 | C28 | 9.58e−10 | | |

FFS[5]

| R = | ∞ | | | | |
|---|---|---|---|---|---|
| k = | 0 | | | | |
| C4 | 1.43e−02 | C6 | 1.39e−02 | C8 | 6.49e−05 |
| C10 | 1.15e−04 | C11 | 2.82e−06 | C13 | 5.81e−06 |
| C15 | 5.07e−06 | C17 | 7.24e−08 | C19 | 1.27e−07 |
| C21 | 9.78e−08 | C22 | 1.31e−09 | C24 | 4.31e−09 |
| C26 | 4.12e−09 | C28 | 1.82e−09 | | |

| Decentration [1] | | | | | |
|---|---|---|---|---|---|
| X | 0.00 | Y | 6.47 | Z | 33.92 |
| α | 7.63 | β | 0.00 | γ | 0.00 |

| Decentration [2] | | | | | |
|---|---|---|---|---|---|
| X | 0.00 | Y | −60.07 | Z | 51.41 |
| α | −19.75 | β | 0.00 | γ | 0.00 |

| Decentration [3] | | | | | |
|---|---|---|---|---|---|
| X | 0.00 | Y | −55.00 | Z | 4.00 |
| α | 0.00 | β | 0.00 | γ | 0.00 |

| Decentration [4] | | | | | |
|---|---|---|---|---|---|
| X | 0.00 | Y | −67.89 | Z | 18.51 |
| α | −36.63 | β | 0.00 | γ | 0.00 |

| Decentration [5] | | | | | |
|---|---|---|---|---|---|
| X | 0.00 | Y | −75.14 | Z | 32.99 |
| α | −94.69 | β | 0.00 | γ | 0.00 |

| Decentration [6] | | | | | |
|---|---|---|---|---|---|
| X | 0.00 | Y | −73.31 | Z | 61.10 |
| α | −142.71 | β | 0.00 | γ | 0.00 |

| Decentration [7] | | | | | |
|---|---|---|---|---|---|
| X | 0.00 | Y | −98.13 | Z | 44.22 |
| α | −101.67 | β | 0.00 | γ | 0.00 |

| Exit Pupil Diameter | 4 mm |
|---|---|

The angle of view in the X-direction (horizontal direction) is 64 degrees, and the angle of view in the Y-direction (vertical direction) is 80 degrees.

EXAMPLE 2

| Surface No. | Radius of Curvature | Surface Separation | Decentration | Refractive Index | Abbe Constant |
|---|---|---|---|---|---|
| Object Surface | ∞ (Dummy Surface) | −1000.00 | | | |
| r1 | ∞ (Exit Pupil) | 10.00 | | | |
| r2 | FRE[1] | 0.00 | Decentration(1) | 1.53 | 55.00 |
| r3 | ASP[1] | 0.00 | Decentration(2) | 1.53 | 55.00 |
| r4 | FRE[1] | 0.00 | Decentration(1) | | |
| r5 | FFS[1] | 0.00 | Decentration(3) | | |
| r6 | FFS[2] | 0.00 | Decentration(4) | 1.53 | 55.00 |
| r7 | FFS[3] | 0.00 | Decentration(5) | 1.53 | 55.00 |
| r8 | FFS[4] | 0.00 | Decentration(6) | 1.53 | 55.00 |
| r9 | FFS[3] | 0.00 | Decentration(5) | | |
| Image Plane | ∞ | 0.00 | Decentration(7) | | |

| FRE[1] | | | | | |
|---|---|---|---|---|---|
| R = | −422.9890161 | | | | |
| k = | −274.161051 | | | | |
| A4 | −3.84e−07 | A6 | 2.30e−10 | A8 | −1.31e−13 |
| A10 | 2.05e−17 | | | | |

| ASP[1] | | | | | |
|---|---|---|---|---|---|
| R = | −91.71798265 | | | | |
| k = | −1.863493468 | | | | |
| A4 | −9.08e−08 | A6 | −2.23e−11 | A8 | 8.44e−16 |

| FFS[1] | | | | | |
|---|---|---|---|---|---|
| R = | ∞ | | | | |
| k = | 0 | | | | |
| C4 | −0.00359194 | C6 | −0.001019501 | C8 | 0.000106962 |
| C10 | 1.48e−05 | | | | |

| FFS[2] | | | | | |
|---|---|---|---|---|---|
| R = | ∞ | | | | |
| k = | 0 | | | | |
| C4 | 7.74e−03 | C6 | 8.99e−03 | C8 | 2.63e−03 |
| C10 | 3.65e−04 | C11 | 3.63e−06 | C13 | −2.48e−04 |

-continued

| | | | | | |
|---|---|---|---|---|---|
| C15 | 1.80e−05 | C17 | −5.54e−07 | C19 | 1.10e−05 |
| C21 | −8.13e−07 | C22 | −9.12e−08 | C24 | −2.49e−08 |
| C26 | −1.96e−07 | C28 | 1.30e−08 | | |

FFS[3]

| | | | | | |
|---|---|---|---|---|---|
| R = | ∞ | | | | |
| k = | 0 | | | | |
| C4 | 1.55e−02 | C6 | 1.43e−02 | C8 | 2.30e−06 |
| C10 | 6.11e−05 | C11 | 7.32e−06 | C13 | −2.39e−06 |
| C15 | 6.27e−06 | C17 | −6.08e−07 | C19 | 9.07e−07 |
| C21 | −2.32e−07 | C22 | −2.00e−09 | C24 | 5.39e−08 |
| C26 | −1.25e−08 | C28 | 1.48e−08 | | |

FFS[4]

| | | | | | |
|---|---|---|---|---|---|
| R = | ∞ | | | | |
| k = | 0 | | | | |
| C4 | 1.40e−02 | C6 | 1.66e−02 | C8 | 1.63e−05 |
| C10 | 7.26e−05 | C11 | 2.98e−06 | C13 | 6.75e−06 |
| C15 | 5.28e−06 | C17 | 8.30e−08 | C19 | 1.01e−07 |
| C21 | 9.55e−08 | C22 | 2.48e−09 | C24 | 8.28e−09 |
| C26 | 6.72e−09 | C28 | 3.27e−09 | | |

Decentration [1]

| | | | | | |
|---|---|---|---|---|---|
| X | 0.00 | Y | 9.86 | Z | 34.32 |
| α | 9.70 | β | 0.00 | γ | 0.00 |

Decentration [2]

| | | | | | |
|---|---|---|---|---|---|
| X | 0.00 | Y | −59.45 | Z | 54.14 |
| α | −17.43 | β | 0.00 | γ | 0.00 |

Decentration [3]

| | | | | | |
|---|---|---|---|---|---|
| X | 0.00 | Y | −55.00 | Z | 6.34 |
| α | −2.00 | β | 0.00 | γ | 0.00 |

Decentration [4]

| | | | | | |
|---|---|---|---|---|---|
| X | 0.00 | Y | −66.80 | Z | 14.64 |
| α | −36.63 | β | 0.00 | γ | 0.00 |

Decentration [5]

| | | | | | |
|---|---|---|---|---|---|
| X | 0.00 | Y | −75.98 | Z | 35.00 |
| α | −87.32 | β | 0.00 | γ | 0.00 |

Decentration [6]

| | | | | | |
|---|---|---|---|---|---|
| X | 0.00 | Y | −70.29 | Z | 59.33 |
| α | −139.84 | β | 0.00 | γ | 0.00 |

Decentration [7]

| | | | | | |
|---|---|---|---|---|---|
| X | 0.00 | Y | −95.92 | Z | 41.83 |
| α | −93.80 | β | 0.00 | γ | 0.00 |

| Exit Pupil Diameter | | 4 mm | |
|---|---|---|---|

The angle of view in the X-direction (horizontal direction) is 36 degrees, and the angle of view in the Y-direction (vertical direction) is 60 degrees.

Tabulated below are the values of the respective component elements and the values of Conditions (1) to (4) in Examples 1 and 2.

TABLE 1

| | Example 1 | Example 2 |
|---|---|---|
| θ1 max | 16.0° | 15.5° |
| θ1 min | 5.9° | 8.2° |
| θ2 max | 61.8° | 59.4° |
| θ2 min | 16.3° | 23.7° |
| LM0 | 44.2 | 43.4 |
| LYM1 | 88.5 | 67.0 |
| LYM1/LM0 | 2.0 | 1.5 |

The eyeball-projection display apparatus 1 according to the embodiments described here, because of having such construction, enables image light exiting out from the image display device 5 to be bent or flexed toward the eyeball and the viewer to view an image as a virtual image.

In consideration of various aberrations induced by the virtual image projection optical system, it is preferable that images shown on the image display device are properly distorted per color or the screen is curved for per color for the purpose of canceling out those aberrations.

By letting the vicinity of the exit pupil EP function as an aperture stop S, it is possible to view images even when the eyeball-projection display apparatus 1 is reduced in size and thickness.

FIG. 11 shows the eyeball-projection display apparatus 1 to one embodiment, which is located sideways.

As shown in FIG. 11, the eyeball-projection display apparatus 1 may be located sideways whereby there is a high degree of freedom achieved in apparatus design or assembly.

REFERENCE SIGNS LIST

1: Eyeball Projection Display Apparatus
2: Eyepiece Optical System

21: Eyepiece Transmitting Surface
22: Eyepiece Reflecting Surface
3: Reflecting Element
30: Intermediate Reflecting Surface
4: Relay Optical System
41: Transmitting Surface
42: Convex Reflecting Surface
43: Concave Reflecting Surface
44: Incident Surface
5: Image Display Device
50: Screen

The invention claimed is:

1. An eyeball-projection display apparatus comprising:
an image display device for showing an image, and
a virtual image projection optical system in which an image shown by the image display device is optically guided into the eyeball of a viewer for projection of a virtual image, wherein:
the virtual image projection optical system includes an eyepiece optical system having an eyepiece optical element including an eyepiece transmitting surface and an eyepiece reflecting surface for reflecting off a light ray incident from the eyepiece transmitting surface and again guiding the light ray back into the same the eyepiece transmitting surface, having a medium filled in between the eyepiece transmitting surface and the eyepiece reflecting surface, the medium having a refractive index of greater than 1, and further including a back-surface reflecting mirror capable of only one reflection in an effective optical path and having a positive power;
a relay optical system having a positive power, and including a prism optical element having a curved, internal-reflecting surface that is decentered with respect to a center chief ray, being filled in with a medium having a refractive index of greater than 1 and being capable of plural internal reflections, and receiving light from the image display device for projection of an intermediate image of an image onto an exit side of the display apparatus; and
a reflecting element that is positioned in an optical path between the eyepiece optical system and the relay optical system and includes an intermediate reflecting surface to reflect a light beam incident obliquely from a side of the display apparatus, on which the relay optical system is located, toward a side of the display apparatus, on which the eyepiece optical system is located, thereby deflecting an optical path.

2. The eyeball-projection display apparatus according to claim 1,
wherein the eyepiece transmitting surface and the eyepiece reflecting surface are each decentered with respect to the center chief ray.

3. The eyeball-projection display apparatus according to claim 1,
wherein the reflecting element includes only one intermediate reflecting surface capable of only one reflection thereby deflecting the optical path.

4. The eyeball-projection display apparatus according to claim 3,
wherein the reflecting surface is a front surface mirror.

5. The eyeball-projection display apparatus according to claim 1,
assuming that the Z-axis is defined by an axis that is along the center chief ray exiting out from the virtual image projection optical system, and that the YZ plane is defined by a plane including the Z-axis and the center chief ray that is incident on and reflected off the eyepiece reflecting surface of the eyepiece optical system,
wherein a center of the image shown on the image display device is positioned between a plane vertical to the Z-axis passing through the outermost position of an effective area of the eyepiece reflecting surface of the eyepiece optical system in the YZ plane and in the Z-axis direction and a plane vertical to the Z-axis passing through the position nearest to the viewer side of an effective area of the intermediate reflecting surface of the reflecting element in the YZ plane and in the Z-axis direction.

6. The eyeball-projection display apparatus according to claim 1,
assuming that that the Z-axis is defined by an axis that is along the center chief ray exiting out from the virtual image projection optical system, and that the YZ plane is defined by a plane including the Z-axis and the center chief ray that is incident on and reflected off the eyepiece reflecting surface of the eyepiece optical system,
wherein an intermediate image of the center of the image shown on the image display device is positioned between a plane vertical to the Z-axis passing through the outermost position of an effective area of the intermediate reflecting surface of the eyepiece optical system in the YZ plane and in the Z-axis direction and a plane vertical to the Z-axis passing through the position nearest to the viewer side of an effective area of the intermediate reflecting surface of the reflecting element in the YZ plane and in the Z-axis direction.

7. The eyeball-projection display apparatus according to claim 5,
wherein an intermediate image at the center of the image shown on the display device is formed in a space between the reflecting element and the eyepiece optical system.

8. The eyeball-projection display apparatus according to claim 1,
wherein the reflecting element is located outside a range through which an effective light beam exiting out from the eyepiece optical system passes.

9. The eyeball-projection display apparatus according to claim 1,
satisfying the following condition (1):

$$1° < \theta1min < \theta1max < 30° \quad (1)$$

where, assuming that the Z-axis is defined by an axis along the center chief ray exiting out from the virtual image projection optical system and the YZ plane is defined by a plane including the Z-axis and the center chief ray incident on and reflected off the eyepiece reflecting surface of the eyepiece optical system $\theta1min$ and $\theta1max$ stand for the minimum and maximum values of the angle of incidence of the chief ray on the YZ plane at the eyepiece reflecting surface of the eyepiece optical system, respectively.

10. The eyeball-projection display apparatus according to claim 1,
satisfying the following condition (2):

$$0.7 < LYM1/LM0 < 5 \quad (2)$$

where, assuming that the Z-axis is defined by an axis along the center chief ray exiting out from the virtual image projection optical system, the YZ plane is defined by a plane including the Z-axis and the center chief ray incident on and reflected off the eyepiece reflecting surface of the eyepiece optical system, and the Y-axis direction is defined by a direction vertical to the Z-axis at the YZ plane LYM1 stands for a length of an effective reflecting surface, as measured in the Y-axis direction, of the eyepiece reflecting surface of the eyepiece optical system at the YZ plane, and LM0 stands for a separation distance between the reflecting element and the eyepiece optical system as measured along the Y-axis direction.

11. The eyeball-projection display apparatus according to claim 1,
wherein the intermediate reflecting surface of the reflecting element has a planar shape.

12. The eyeball-projection display apparatus according to claim 1,
wherein the intermediate reflecting surface of the reflecting element has a curved shape.

13. The eyeball-projection display apparatus according to claim 12,
wherein the intermediate reflecting surface of the reflecting element has an aspheric curved shape.

14. The eyeball-projection display apparatus according to claim 13,
wherein the intermediate reflecting surface of the reflecting element has a non-rotationally symmetric aspheric shape having a total of two symmetric surfaces at most.

15. The eyeball-projection display apparatus according to claim 1,
wherein the reflecting surface includes a diffracting surface.

16. The eyeball-projection display apparatus according to claim 1,
wherein the intermediate reflecting surface of the reflecting element satisfies the following condition (3):

$$-30°<\theta<10° \quad (3)$$

where, assuming that the Z-axis is defined by an axis along the center chief ray exiting out from the virtual image projection optical system, θ is an angle between a tangent plane in a position of passage of the center chief ray at the intermediate reflecting surface of the reflecting element and a plane vertical to the Z-axis, with a negative sign in the case where the tangent plane tilts in a direction coming closer to the viewer side as it is spaced further away from the Z-axis.

17. The eyeball-projection display apparatus according to claim 1,
wherein the prism optical system of the relay optical system includes at least three optical surfaces decentered with respect to one another, wherein:
any one of the optical surfaces is an incident surface having transmission in a normal optical path, and there is a non-rotationally symmetric concave reflecting surface located in opposition to the incident surface, there is a non-rotationally symmetric convex reflecting surface located in opposition to the concave reflecting surface, the incident surface and the concave reflecting surface are decentered with respect to each other, and there is a transmitting surface positioned on a side of the prism optical element on which a distance between the incident surface and the concave reflecting surface grows long.

18. The eyeball-projection display apparatus according to claim 17,
wherein any one of the optical surfaces of the prism optical element of the relay optical system is a combined reflecting and transmitting surface in a normal optical path.

19. The eyeball-projection display apparatus according to claim 1,
satisfying the following condition (4):

$$5°<\theta2min<\theta2max<80° \quad (4)$$

where, assuming that the Z-axis is defined by an axis along the center chief ray exiting out from the virtual image projection optical system and the YZ plane is defined by a plane including the Z-axis and the center chief ray incident on and reflected off the eyepiece reflecting surface of the eyepiece optical system, θ2min and θ2max stand for the minimum and maximum values of the angle of incidence of the center chief ray on the YZ plane at the reflecting surface of the reflecting element, respectively.

20. The eyeball-projection display apparatus according to claim 19,
satisfying the following condition (5):

$$35°<\theta2max-\theta2min<70° \quad (5)$$

* * * * *